United States Patent [19]

Shah et al.

[11] Patent Number: 6,018,737

[45] Date of Patent: Jan. 25, 2000

[54] UNIVERSAL PERSONAL TELECOMMUNICATIONS SERVICE FOR AN ADVANCED INTELLIGENT NETWORK

[75] Inventors: Tasvir Shah, Irving; Jeffrey D. Copley, Garland; Conrad L. Jacunski, Plano, all of Tex.

[73] Assignee: Alcatel USA Sourcing, L.P., Plano, Tex.

[21] Appl. No.: 08/993,436

[22] Filed: Dec. 18, 1997

[51] Int. Cl.[7] .................................................. G06F 17/30
[52] U.S. Cl. ........................... 707/10; 379/913; 455/461
[58] Field of Search ............................. 707/10; 379/913; 455/461

[56] References Cited

U.S. PATENT DOCUMENTS

| | | | |
|---|---|---|---|
| 4,899,373 | 2/1990 | Lee et al. | 379/207 |
| 5,255,183 | 10/1993 | Katz | 705/30 |
| 5,315,636 | 5/1994 | Patel | 455/461 |
| 5,353,331 | 10/1994 | Emery et al. | 455/461 |
| 5,392,342 | 2/1995 | Rosenthal | 379/211 |
| 5,495,521 | 2/1996 | Rangachsr | 379/93.04 |
| 5,579,379 | 11/1996 | D'Amico et al. | 379/112 |
| 5,586,171 | 12/1996 | McAllister et al. | 379/88.02 |
| 5,592,533 | 1/1997 | McHenry et al. | 455/435 |
| 5,758,159 | 5/1998 | Collet | 709/303 |
| 5,771,386 | 6/1998 | Baumbauer | 395/710 |

*Primary Examiner*—Paul R. Lintz
*Assistant Examiner*—Jean Bolte Fleurantin
*Attorney, Agent, or Firm*—Baker & Botts, L.L.P.

[57] ABSTRACT

A universal personal telecommunications service includes the steps of receiving, at a home service switching point, a telephone number entered by a caller, sending a query to the service control point coupled to the service switching point, which verifies the received telephone number as a personal telecommunications number assigned to a service subscriber. The telephone number is then translated by the service control point to a current destination number by consulting routing data indicative of a current location of the service subscriber, the routing data including follow-me diversion data and time dependent routing data. The call is then completed to the current destination number of the service subscriber.

12 Claims, 5 Drawing Sheets

FIG. 9

UNIVERSAL PERSONAL TELECOMMUNICATIONS SERVICE FOR AN ADVANCED INTELLIGENT NETWORK

TECHNICAL FIELD OF THE INVENTION

This invention is related in general to the field of telecommunications. More particularly, the invention is related to a universal personal telecommunications service for an advanced intelligent network (AIN).

BACKGROUND OF THE INVENTION

With the advent of the advanced intelligent network (AIN), it has become possible to rapidly design and introduce many new enhanced telecommunications services that provide added flexibility and convenience in how we use our telephone equipment.

The advanced intelligent network typically includes switches or service switching points (SSPs) coupled to signal transfer points (STPs), which are in turn coupled to service control points (SCPs). The interconnections between service switching points and service control points employ the signaling system number 7 or SS7 protocol for sending query messages associated with the execution of services. The service control points executes service logic programs which define the services and further store and maintain databases that have data associated with the services. The service control points are further coupled to a service management system (SMS), which supports the operations, administrations, management, and provisioning (OAM&P) needs of the network. The advanced intelligent network further includes intelligent peripherals, which are coupled to service switching points and the service management system, and provide pre-recorded voice announcements, voice synthesis, and other functionalities that generally facilitate interaction with service subscribers and customers. The connection between the service management system and other network nodes is typically via X.25 links. In the advanced intelligent network, telecommunications services are typically defined in a service creation environment (SCE) node by the service provider and then relayed to the service management system, which disseminates the service logic programs to the rest of the network for execution.

The International Telecommunications Union (ITU) and other standard setting bodies have promulgated recommendations and requirements for advanced intelligent network services. One service is the universal personal telecommunications service, which basically allows a service subscriber to be reached with one telephone number, regardless of his/her present location. However, these standards do not spell out how this service is to be implemented and the specific service features that support this service.

SUMMARY OF THE INVENTION

Accordingly, there is a need for a universal personal telecommunications service for the advanced intelligent network that provides the basic service of allowing the service subscriber to be reached with one telephone number regardless of his/her present location.

In an aspect of the invention, a universal personal telecommunications service includes the steps of receiving, at a home service switching point, a telephone number entered by a caller, sending a query to the service control point coupled to the service switching point, which verifies the received telephone number as a personal telecommunications number assigned to a service subscriber. The telephone number is then translated by the service control point to a current destination number by consulting routing data indicative of a current location of the service subscriber, the routing data including follow-me diversion data and time dependent routing data. The call is then completed to the current destination number of the service subscriber.

In another aspect of the invention, a universal personal telecommunications service includes the steps of receiving, at a home service switching point, a personal telecommunications number entered by a caller, sending a query to the service control point coupled to the home service switching point for verification as being associated with a service subscriber. The service control point then consults a database having data associated with the service subscriber and determines a current destination number for the service subscriber. The service control point further determines whether the service subscriber desires to receive the call depending on the time of day, day of week, or day of year. The current destination number is then sent to the home service switching point, and the call is routed to a different service switching point than the home service switching point for completing the call to the current destination number.

BRIEF DESCRIPTION OF THE DRAWINGS

For a better understanding of the present invention, reference may be made to the accompanying drawings, in which.

DETAILED DESCRIPTION OF THE INVENTION

The preferred embodiments of the present invention are illustrated in FIGS. 1–9, like reference numerals being used to refer to like and corresponding parts of the various drawings.

Figure 1:
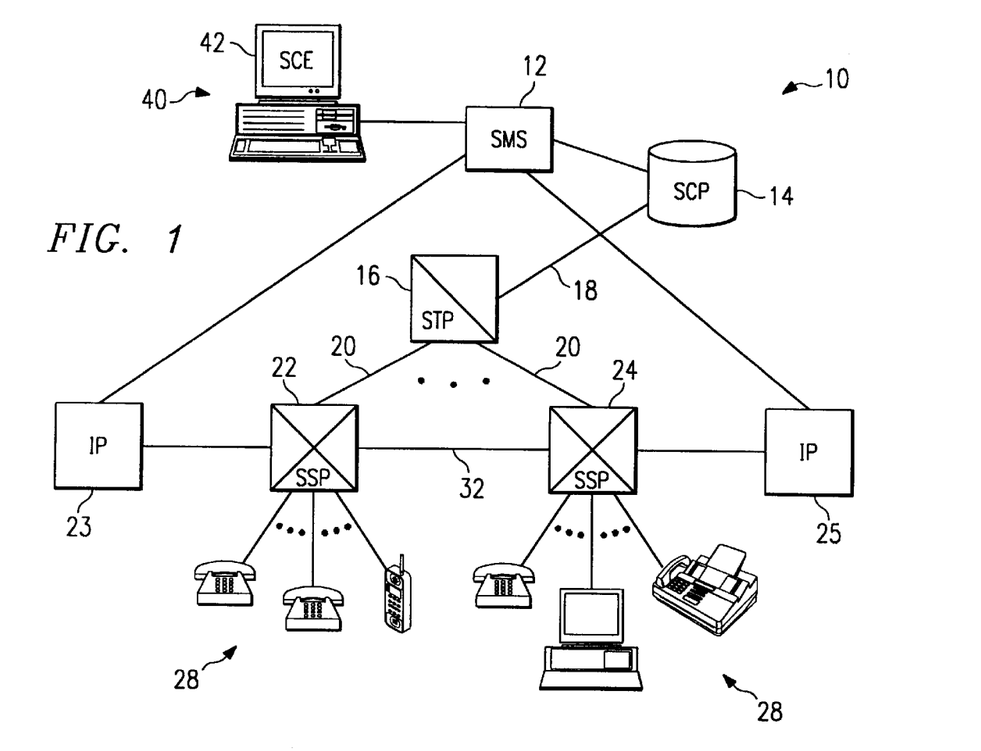
FIG. 1 is a simplified block diagram of an advanced intelligent network (AIN)

Referring to FIG. 1, a simplified block diagram of an exemplary advanced intelligent network (AIN) is shown. FIG. 1 shows an exemplary telecommunications network 10 such as an advanced intelligent network (AIN) or intelligent network (IN). Network 10 includes a service management system (SMS) 12 which interfaces with a service control point (SCP) 14 via an industry standard protocol such as X.25. Service management system 12 provides network information, database management, and administrative support for network 10. Service management system 12 generally interfaces with service control point 14 for provisioning, database management, service control point application program management, and collecting traffic metering and measurement data. Service control point 14 is also directly linked to signal transfer point 16 via an SS7 (signaling system number 7) link set 18. Based on present industry practice, an SS7 link set may include up to sixteen 56 or 64 Kbits/second links. Signal transfer point 16 is further coupled to one or more service switching points (SSPs) 22 and 24, which perform the switching and call handling functions in the network via SS7 link sets 20. An intelligent peripheral (IP) 23 is coupled to service switching point 22 and another intelligent peripheral 25 is coupled to service switching point 24. Intelligent peripherals 23 and 25 may provide an interface to callers and users such as pre-recorded or voice synthesized announcements and prompts.

Service control point 14 is a transaction based processing system whose primary responsibility is to respond to queries from service switching points 22 and 24 for data needed to complete routing a call. Service switching points 22 and 24 are part of the public switched telephone network and are coupled to the customer premises equipment (CPE) 28 of telephone service subscribers.

Network services are generally implemented in a service creation environment (SCE) 40 through a graphical user interface 42 to produce service logic programs that are then downloaded to network elements such as service management system 12, and/or service control point 14, where they are executed.

Figure 2:
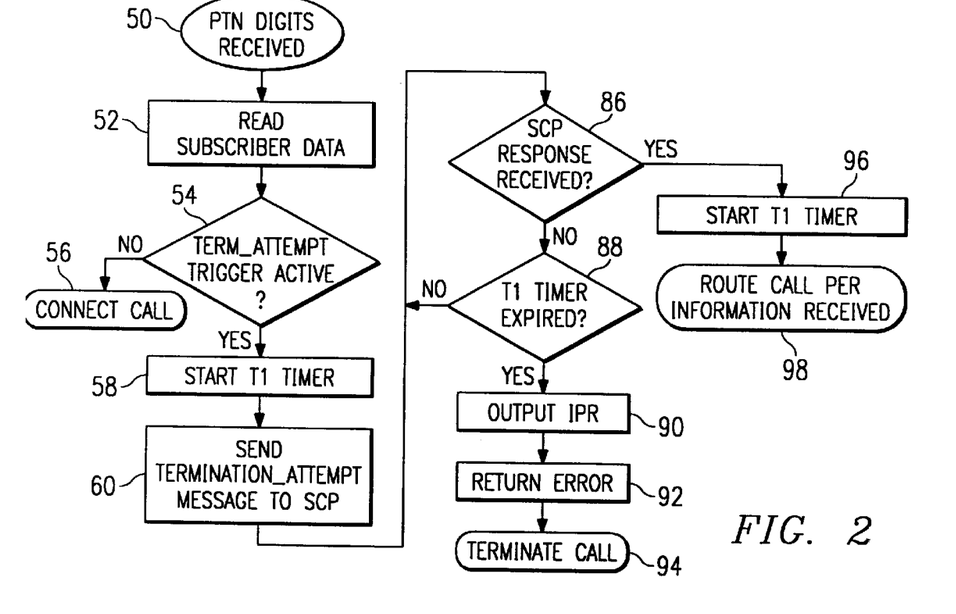
FIG. 2 is a simplified flowchart of an embodiment of the universal personal telecommunications service (UPT) service switching point call flow according to the teachings of the present invention.

Referring to FIG. 2, a simplified flowchart of an embodiment of service switching point call processing flow for universal personal telecommunications service according to the teachings of the present invention is shown. In block 50, a recognized personal telecommunications number (PTN) is received by the service switching point. The personal telecommunications number is a unique telephone number assigned to a service subscriber. A calling party accesses the universal personal telecommunications service subscriber by dialing the subscriber's personal telecommunications number. The call is routed to the subscriber's home service switching point, which recognizes that the called party is a subscriber of the universal personal telecommunications service by reading the subscriber's data associated with the personal telecommunications number, as shown in block 52. The universal personal telecommunications service detection is activated at a termination attempt point in the call, as shown in block 54. If the termination attempt trigger is not active, then the call is treated as a normal call and connected accordingly. Otherwise, the service switching point sends a query message to the service control point for further processing of the call. The service switching point queries the service control point by starting a T1 timer, and sending the subscriber's personal telecommunications number in a termination_attempt message to the service control point, as shown in blocks 58 and 60.

Figure 3:
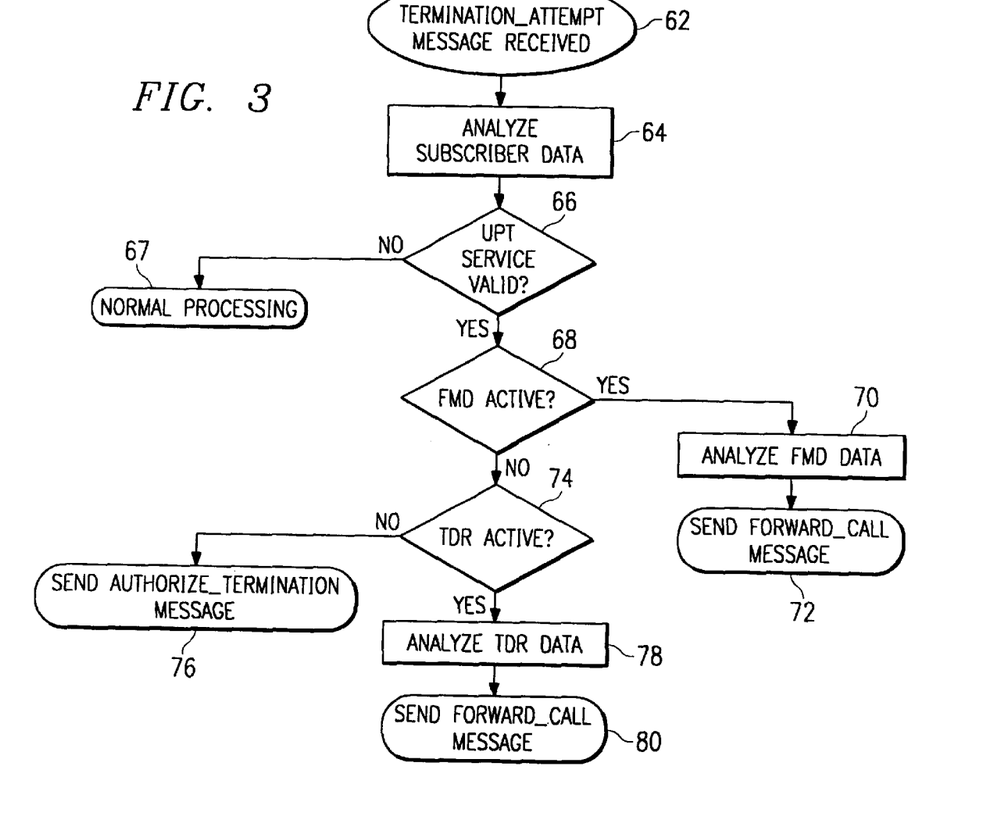
FIG. 3 is a simplified flowchart of an embodiment of the universal personal telecommunications service control point call flow according to the teachings of the present invention.

Referring now to block 62 in FIG. 3, the service control point receives the termination_attempt message. The service control point analyzes the subscriber's personal telecommunications number and verifies that the number is valid and associated with a universal personal telecommunications subscriber, as shown in blocks 64 and 66. If the number is not a valid or an assigned universal personal telecommunications service number, then normal call processing is performed, as shown in block 68. The service control point then determines whether the follow-me diversion (FMD) feature is active for the particular subscriber, as shown in block 69. The follow-me diversion service feature allows the service subscriber to be reached at the same personal telecommunications number regardless of his/her location. If the follow-me diversion service feature is active, then the data associated with this service feature is analyzed, as shown in block 70. If the follow-me diversion data indicates that the call should be routed to a different destination, such as a cellular, pager, voice mail, wire-line, or wireless telephone number, then the service control point sends the appropriate routing information to the service switching point in a forward_call message, as shown in block 72. If the follow-me diversion data does not indicate routing to a different destination (i.e. not active) in block 69, then the service control point determines whether the time dependent routing (TDR) service feature is active, as shown in block 74. This service feature enables the service subscriber to accept or reject a call, and in the case of acceptance, to route the call according to the time of day, day of week, or the date. If the time dependent routing service feature indicates that the call should be terminated because the subscriber is not accepting the call (i.e. not active), then the service control point sends an authorize_termination message to the service switching point to disconnect the call, as shown in block 76. Otherwise, the time dependent routing data is analyzed to determine the destination address, as shown in block 78, and sent in a forward_call message to the service switching point, as shown in block 80.

Returning to FIG. 2, the service switching point determines whether a response is received from the service control point in block 86. If no response is received, the service switching point checks to see whether the T1 timer has expired, as shown in block 88. If the timer has expired, then an information and problem report (IPR) is generated, as shown in block 90, and an error indication is returned, as shown in block 92. The call is terminated in block 94. An announcement may be played to the caller to request the placement of the call at a later time, for example.

If a response is received from the service control point, then the T1 timer is stopped in block 96, and the call is routed according to the routing information provided by the service control point in the response message, as shown in block 98. The routing information may specify the network address of a different service switching point coupled to a customer premises equipment at which the service subscriber is currently located.

Figure 4:
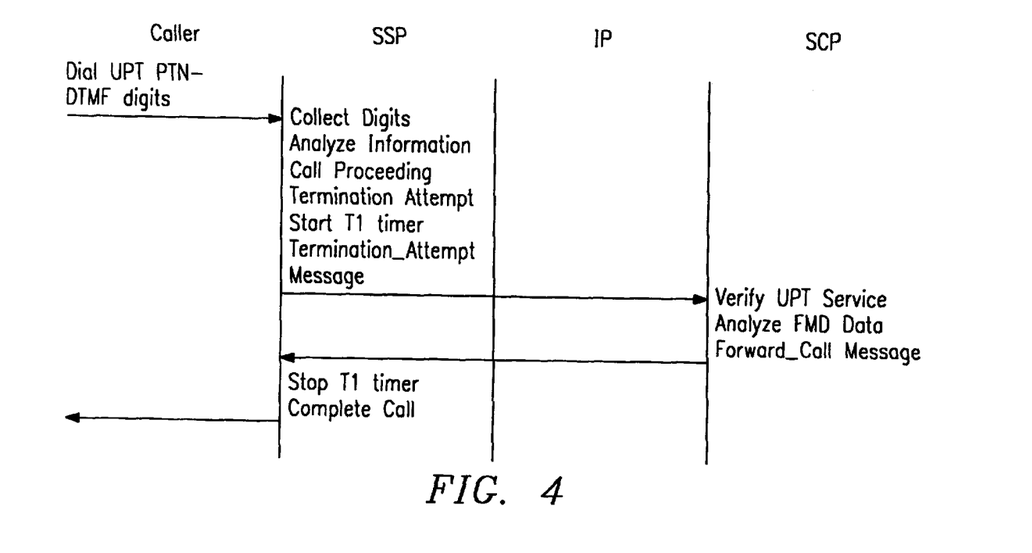
FIG. 4 is a simplified message flow diagram of an embodiment of the universal personal telecommunications service process with follow-me diversion (FMD) active according to the teachings of the present invention.

Referring to FIGS. 4–8, several call scenarios are illustrated in message flow format. In FIG. 4, the follow-me diversion service feature is active. The caller dials or enters the personal telecommunications number of the service subscriber to attempt to reach him/her. The service switching point collects the digits dialed by the caller and proceeds to process the call. At the termination attempt point in call processing, a trigger activates the universal personal telecommunications service. The T1 timer is started, and the service switching point sends a termination_attempt message to the service control point. Upon receipt of the termination_attempt message, the service control point analyzes the follow-me diversion data and provides a destination address or routing information in accordance with the follow-me diversion data. The destination address is then sent to the service switching point in a forward_call message. The service switching point, upon receipt of the forward_call message, stops the T1 timer and completes the call according to the routing information contained in the forward_call message.

Figure 5:
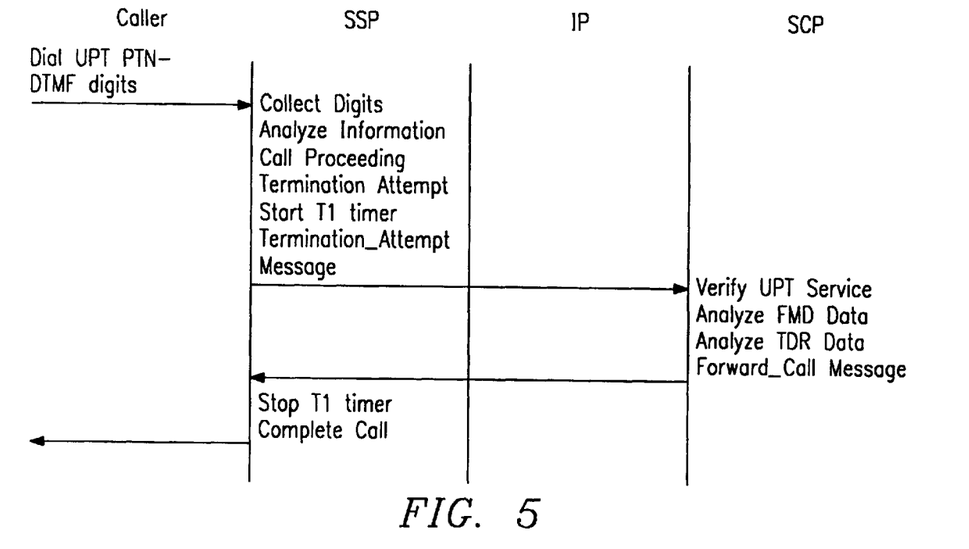
FIG. 5 is a simplified message flow diagram of an embodiment of the universal personal telecommunications service process with follow-me diversion inactive and time dependent routing (TDR) forwarding active according to the teachings of the present invention.

FIG. 5 provides a message flow of a call with follow-me diversion inactive and time dependent routing active. In this scenario, the service control point analyzes the follow-me diversion data and determines that the follow-me diversion data does not provide a different destination address or routing information. The service control point then goes on to analyze the time dependent routing data and provides a destination address indicated by the time dependent routing data in a forward_call message to the service switching point. The service switching point then completes the call accordingly.

Figure 6:
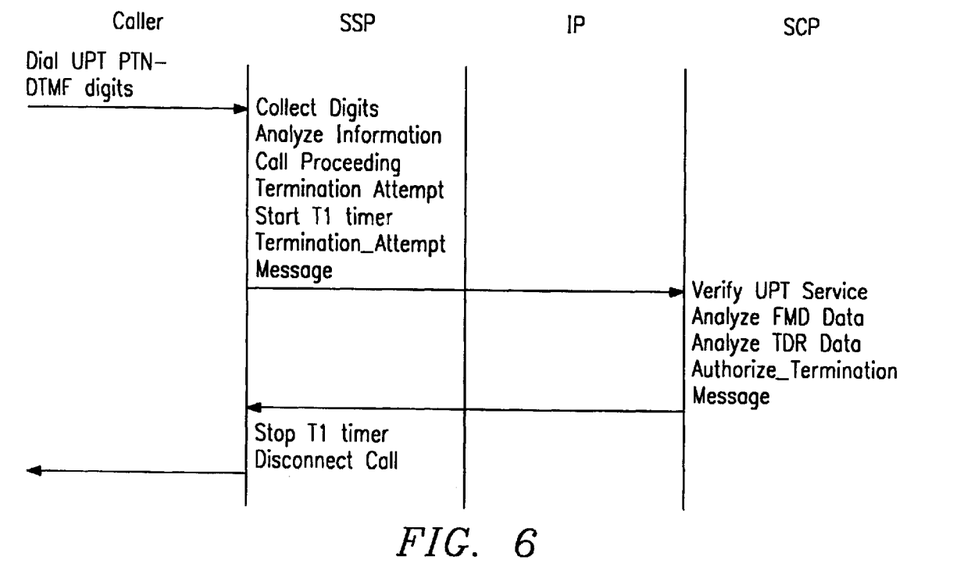
FIG. 6 is a simplified message flow diagram of an embodiment of the universal personal telecommunications service process with follow-me diversion and time dependent routing inactive according to the teachings of the present invention.

In FIG. 6, when the service control point analyzes the query, the follow-me diversion data does not indicate a different destination address, and further, the time dependent routing data indicates that the call should be disconnected, the service control point sends an authorize_termination message to the service switching point. The service switching point then disconnects the call accordingly.

Figure 7:
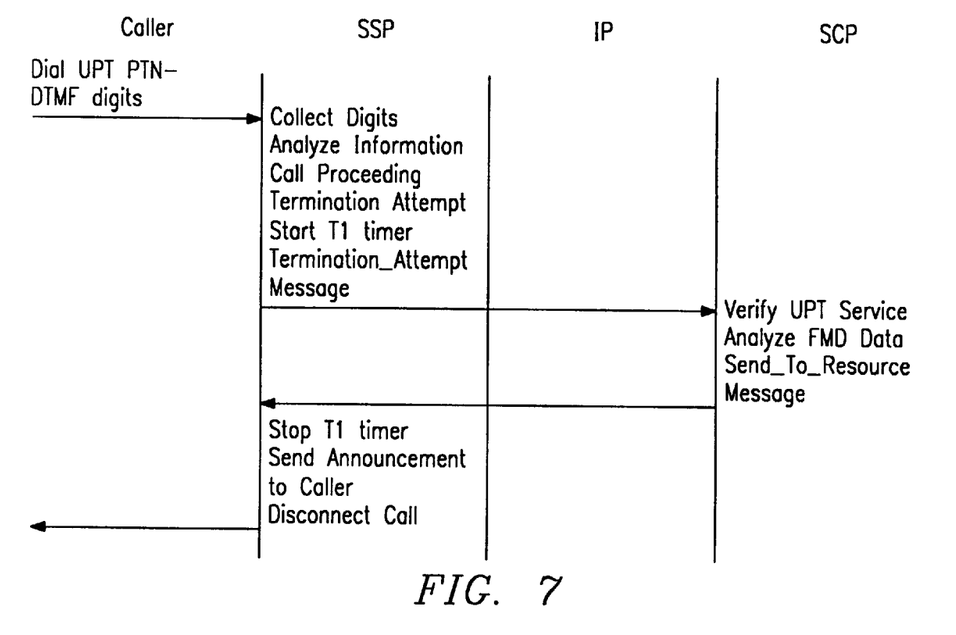
FIG. 7 is a simplified message flow diagram of an embodiment of the universal personal telecommunications service process with follow-me diversion rerouting calls to terminating announcements according to the teachings of the present invention.

In the call scenario shown in FIG. 7, the follow-me diversion data indicates that the call is to be routed to a terminating announcement. This instruction is sent by the service control point to the service switching point in a send_to_resource message. The service switching point then plays an appropriate announcement (or requests the intelligent peripheral to play the announcement) and disconnects the call.

Figure 8:
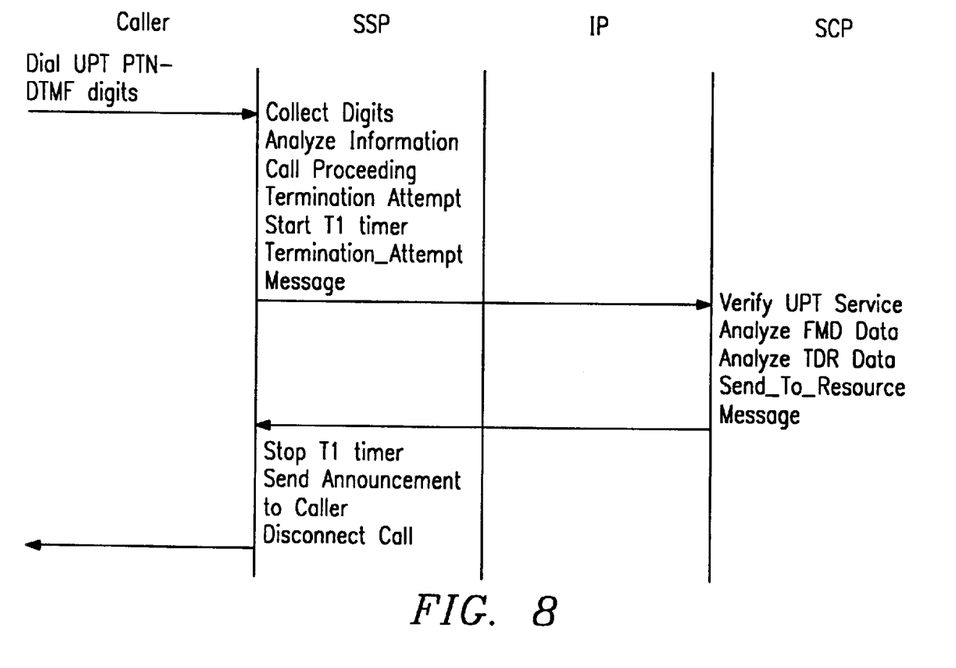
FIG. 8 is a simplified message flow diagram of an embodiment of the universal personal telecommunications service process with time dependent rerouting calls to terminating announcements according to the teachings of the present invention.

In the call scenario shown in FIG. 8, the follow-me diversion data indicates that this service feature is inactive, and the time dependent routing indicates that the call is to be routed to a terminating announcement. The service control point sends this instruction to the service switching point in a send_to_resource message. The service switching point then plays an appropriate announcement (or requests the intelligent peripheral to play the announcement) and disconnects the call.

Figure 9:
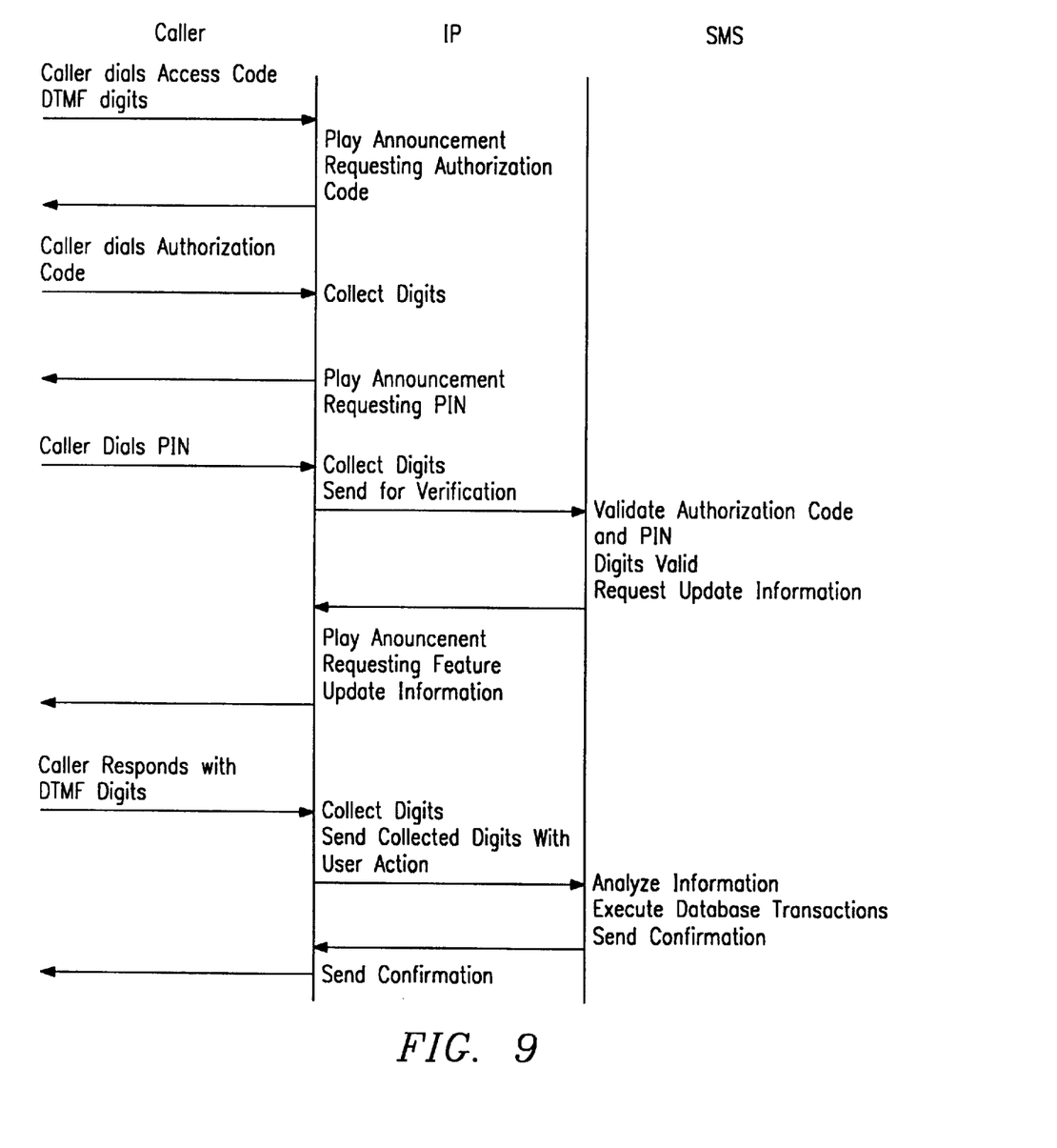
FIG. 9 is a simplified message flow diagram of an embodiment of the universal personal telecommunications service update process according to the teachings of the present invention.

Referring to FIG. 9, an exemplary message flow diagram of service feature update is shown. The caller dials an access code, which is received by the intelligent peripheral. The intelligent peripheral plays an originating user prompter, which prompts the caller to enter a predetermined authentication code. The length of the authentication code may be specified by the service provider up to a design maximum. Preferably, the service subscriber does not have the ability to alter this code. After the caller dials in the authentication code, the intelligent peripheral collects the digits, and further plays an announcement prompting the caller to enter a personal identification number (PIN). The caller dials the personal identification number and the personal identification number is collected by the intelligent peripheral. Each authentication code has a corresponding optional personal identification number associated therewith. The personal identification number acts as an authorization or security code which is used to validate the caller. The length of the personal identification number may be configured by the service provider within a predefined range of digits. However, the service subscriber may have the capability to change his/her personal identification number by dialing a special access number provided by the service provider. A personal identification number that has been disabled due to fraud cannot be changed by the service subscriber.

Upon receipt of both numbers, the intelligent peripheral then sends the collected authentication code and personal identification number to the service management system for verification. The service management system validates the authentication code and personal identifier by consulting a database. If the items are not correct, the service management system sends a message to the intelligent peripheral to either disconnect the caller or to allow the caller to re-enter the numbers. To prevent fraud, a re-entry counter may be implemented to count the number of re-tries, so that possible fraudulent use may be detected. If the authentication code and personal identification number are valid, the service management system sends a message back to the intelligent peripheral to request for service update information. The intelligent peripheral then plays an appropriate announcement prompting the caller to enter service feature update information. The prompt may provide a menu of options that allows the caller to change and/or enter update information. The caller responds by dialing one or more digits, which are collected by the intelligent peripheral and sent to the service management system. The service management system analyzes the update digits and the service feature information stored in its database, and executes database transactions accordingly. Upon completion of the update, a confirmation is sent to the intelligent peripheral, which plays an announcement informing the caller that the update has been completed.

Although not explicitly shown, the universal personal telecommunications service preferably provides a peg counter of service accesses, which increments each time a call is received by a service subscriber. A peg count of each service control point transaction may also be provided.

Further, a personal numbering service feature may be provided to uniquely identify each service subscriber. This personal number is used by the caller to reach the service subscriber. A service subscriber may have more than one universal personal telecommunications number for different applications, but the personal number is the same for all applications.

The billing of the universal personal telecommunications service may be split among more than one party. The calling party may be charged for the part of the call to the called party's home service switching point, and the universal personal telecommunications service subscriber may be charged for the part of the call form the home service switching point to the current destination specified by the service subscriber.

Constructed and operating in this manner, the universal personal telecommunications service subscriber may be reached by a personal telecommunications number regardless of his/her location. The calling party accesses the service subscriber by dialing the personal telecommunications number assigned to that service subscriber. The call is routed to the service subscriber's home service switching point. The home service switching point recognizes that the called party is a service subscriber of universal personal telecommunications service, and sends a query message to the service control point requesting routing information, which may yield an alternate destination number than the default destination number. Based on the service subscriber's specific instructions stored in the service control point, the call may be routed to a wired number, wireless number, voice mail, or an intelligent peripheral for announcements. The service subscriber may also opt to not receive any calls or apply different call treatment dependent on the time of day, day of week, or the date of the call.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A universal personal telecommunications service, comprising the steps of:
   receiving, at a home service switching point, a telephone number entered by a caller;
   sending a query to the service control point coupled to the service switching point;
   verifying, at the service control point, the received telephone number as a personal telecommunications number assigned to a service subscriber;
   determining whether follow-me diversion and time dependent routing services are activated;
   translating the telephone number to a current destination number by consulting routing data indicative of a current location of the service subscriber, the routing data including follow-me diversion data and time dependent routing data; and
   completing the call to the current destination number in response to the follow-me diversion and time dependent routing services being activated.

2. The universal personal telecommunications service, as set forth in claim 1, wherein the translating step comprises the step of determining whether the follow-me diversion data specifies a different current destination number than a default destination number.

3. A universal personal telecommunications service, comprising the steps of:
   receiving, at a home service switching point, a telephone number entered by a caller;
   sending a query to the service control point coupled to the service switching point;
   verifying, at the service control point, the received telephone number as a personal telecommunications number assigned to a service subscriber;
   translating the telephone number to a current destination number by consulting routing data indicative of a current location of the service subscriber, the routing data including follow-me diversion data and time dependent routing data; and
   completing the call to the current destination number;
   wherein the translating step comprises the steps of:
   determining the destination number according to the day of year of the call;
   determining the destination number according to the day of week of the call; and/or
   determining the destination number according to the time of day of the call.

4. The universal personal telecommunications service, as set forth in claim 3, wherein the translating step comprises the step of terminating the call dependent on the day of year, day of week, and/or time of day of the call.

5. The universal personal telecommunications service, as set forth in claim 3, wherein the translating step comprises the step of routing the call to an intelligent peripheral for a termination announcement dependent on the day of year, day of week, and/or time of day of the call.

6. The universal personal telecommunications service, as set forth in claim 1, further comprising the step of monitoring a number of queries to the service control point.

7. The universal personal telecommunications service, as set forth in claim 1, further comprising the step of sending the translated destination number to the home service switching point for call completion.

8. The universal personal telecommunications service, as set forth in claim 1, further comprising the step of sending the translated destination number to a different service switching point than the home service switching point for call completion.

9. A universal personal telecommunications service, comprising the steps of:
   receiving, at a home service switching point, a personal telecommunications number entered by a caller;
   sending a query to the service control point coupled to the home service switching point;
   verifying, at the service control point, the received personal telecommunications number associated with a universal personal telecommunications service subscriber;
   determining, at the service control point, whether the service subscriber desires to divert the call to a location different from the subscriber's location;
   consulting a database having data associated with the service subscriber and determining a current destination number desired by the service subscriber;
   determining, at the service control point, whether the call is desired to be received depending on the time of day, day of week, or day of year;
   sending the current destination number to the home service switching point; and
   routing the call to a different service switching point than the home service switching point for completing the call to the current destination number.

10. A universal personal telecommunications service, comprising the steps of:
   receiving, at a home service switching point, a telephone number entered by a caller;
   sending a query to the service control point coupled to the service switching point;
   verifying, at the service control point, the received telephone number as a personal telecommunications number assigned to a service subscriber;
   translating the telephone number to a current destination number by consulting routing data indicative of a current location of the service subscriber, the routing data including follow-me diversion data and time dependent routing data; and
   completing the call to the current destination number;
   wherein the translating step comprises the step of terminating the call dependent on the day of year, day of week, and/or time of day of the call.

11. A universal personal telecommunications service, comprising the steps of:

receiving, at a home service switching point, a personal telecommunications number entered by a caller;

sending a query to the service control point coupled to the home service switching point;

verifying, at the service control point, the received personal telecommunications number associated with a universal personal telecommunications service subscriber;

consulting a database having data associated with the service subscriber and determining a current destination number for the service subscriber;

determining, at the service control point, whether the service subscriber desires to receive the call depending on the time of day, day of week, or day of year;

sending the current destination number to the home service switching point; and routing the call to a different service switching point than the home service switching point for completing the call to the current destination number;

wherein the translating step comprises the step of routing the call to an intelligent peripheral for a termination announcement dependent on the day of year, day of week, and/or time of day of the call.

12. The universal personal telecommunications service, as set forth in claim 9, further comprising the step of monitoring a number of queries to the service control point.

* * * * *